UNITED STATES PATENT OFFICE.

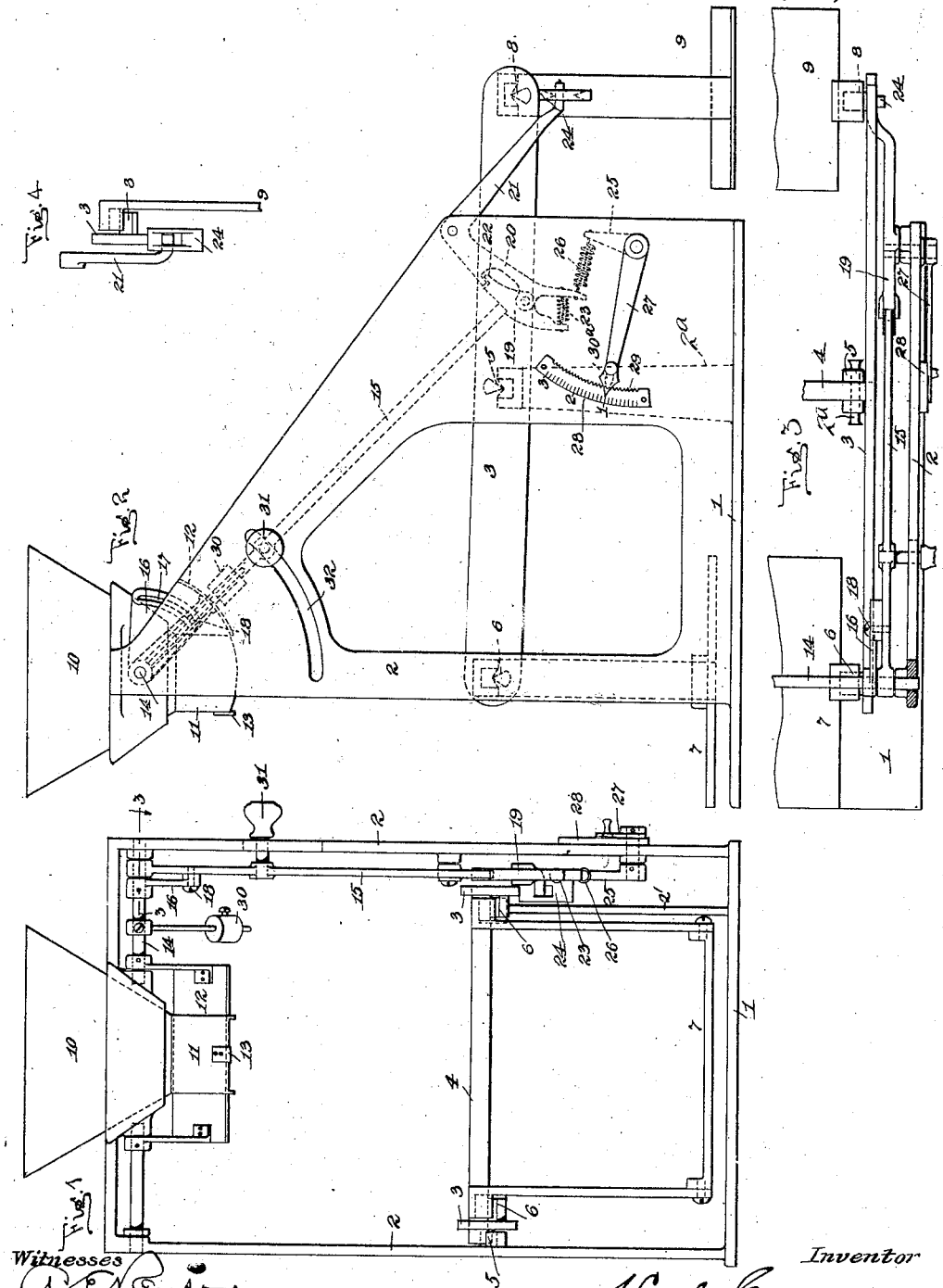

HUGH CAMERON, OF NEWARK, NEW JERSEY, ASSIGNOR TO ROBERT D. KENT, OF PASSAIC, NEW JERSEY.

AUTOMATIC SCALE.

1,422,664.  Specification of Letters Patent.  Patented July 11, 1922.

Application filed November 15, 1919. Serial No. 338,308.

*To all whom it may concern:*

Be it known that I, HUGH CAMERON, a citizen of the United States, and a resident of Newark, in the county of Essex and State of New Jersey, have invented a certain new and useful Automatic Scale, of which the following is a specification.

My invention relates to scales adapted to weigh commodities in granular, pulverized or liquid form, and more particularly to that type of scale in which the material to be weighed is fed continuously to a hopper whence it is intermittently directed either to a weighing hopper in which it is weighed, and from which the material is deposited in a container such as a carton or bag, or the material from the first hopper may be deposited directly in the container and weighed therein.

In scales of the type described, the first hopper is provided with a gate for cutting off the supply delivered thereby. The gate must necessarily be located some distance above the mouth of the container in which the material is weighed, and the amount of material in transit between the hopper and the container after the gate is closed must be accurately weighed in order that each container may contain the same amount of material as each other container.

In one form of prior devices the gate is released by electro-magnetic devices. In such devices the magnets, or the current supplied thereto are subject to change caused by leakage in the circuit, to contacts becoming foul, to batteries running down. When trouble occurs it is difficult to locate and the services of an expert are required to locate and cure the trouble.

In the second class of prior devices the gate is released to close by mechanical means, generally by a releasing mechanism consisting of one or more levers or latches holding a spring or weight which, when released, will close the gate and cut off the supply from the receiving hopper. The latch or lever is released by a contact or blow delivered by the rising of the weight end of the scale beam, which must travel a considerable distance from its down or inert position before it will acquire momentum sufficient to accomplish its purpose. Such travel is generally more than is sufficient to bring the lever to the horizontal position, so that the determination of the weight is made when the beam is in a position other than that of equilibrium. The force necessary to release the gate being constant the weight cannot vary on any single type below the amount necessary to give the beam the necessary momentum, and at all times the amount of material in the air after the closing of the gate is an element of calculation only.

The objects of the invention of this application are to provide a device by means of which the amount of material in the air at the closing of the gate may be accurately weighed, by means of which extremely fine adjustment as to the amount of material weighed may be made, by means of which friction will be largely eliminated, wherein the size of the discharge opening may be adjusted within wide limits, which will be simple in construction, cheap to manufacture and which will not easily get out of order.

These and further objects will more fully appear in the following specification and accompanying drawings considered together or separately.

One embodiment of the invention is illustrated in the accompanying drawings, in which like parts in each of the several figures are designated by similar characters of reference, and in which—

Fig. 1 is an elevation of the load end of a scale made in accordance with my invention.

Fig. 2 is a side elevation of the same.

Fig. 3 is a top plan view of a portion of the scale, and

Fig. 4 is a detail elevation of the weight end of a beam member.

In carrying the invention into practice a frame is provided comprising a base 1 and standards 2. The frame may conveniently be made of cast metal in the box-like form shown.

The scale beam illustrated is composed of two beam members 3 spaced apart and secured together by means of a bar or rod 4 whereby the beam members may be regarded as a single, unitary structure or beam. The beam as a whole is pivoted between the standards 2 by knife-edge or other suitable bearings 5. In the embodiment of the invention illustrated the stationary or groove element of one of the pivot bearings 5 is carried by a standard 2 and the other by a supplemental standard 2ª and the knife-edge elements are formed on the bar 4.

Carried on anti-friction bearings 6 at the work end of the beam is a tray or pan 7 on which the receptacle to be filled rests. Depending from the opposite or weight end of the beam and supported on anti-friction bearings is a weight carrier 9.

Supported in the scale frame 1—2 and directly above the center of the pan 7 is a receiving hopper 10 into which the material to be weighed is directed in a continuous stream. The hopper is provided with a spout 11 adapted to be closed by means of a swinging valve or gate 12. At one side the spout is provided with a lip 13 forming a stop. The gate, in the embodiment of the invention illustrated, is composed of a plate curved to the arc corresponding to the curved lower extremity of the spout 11, but it is to be understood that gates of other form may be employed. The gate is carried on arms at either side of the spout and the arms are secured to short alined shafts 14 journaled in the upper end of the scale frame.

Rigidly secured to one of the shafts 14 is a lever arm on which is adjustably mounted a weight 30 provided with means, such as a screw, by which the weight may be locked in any desired position on the arm.

Carried on the same shaft 14 is a long lever or pendulum 15. The pendulum lever is free to oscillate relatively to the shaft. A member 16 is rigidly secured to the shaft 14 in proximity to the pivot of the pendulum. The member is provided with a segmental slot 17 and a screw 18 passes through the slot 17 and is threaded into the pendulum lever as shown, whereby when the latter is clamped to the member the lever will be locked against movement relatively to the shaft 14.

The free end of the pendulum lever 15 is adapted to engage a latch 19 pivoted between ears to one arm 20 of bell crank lever pivoted to one of the standards 2. The latch is provided with a finger 22 adapted to engage a stop on the arm 20 and limit the movement of the latch in one direction. A tension spring 23 is interposed between the latch and the arm 20 whereby the finger 22 will be normally held in engagement with the stop on the arm 20. The latch is provided with a lip against which the end of the pendulum lever 15 engages whereby the latter will be normally retained in engagement with the latch when the scale beam is at rest with no load on the pan 7. One arm 21 of the bell crank passes through a slot in an element 24 carried by the scale beam in proximity to the support 8 of the weight 9.

A lever 25 pivoted to one of the standards 2 is connected to the arm 20 of the bell crank by means of a tension spring 26. The office of the spring 26 is to always retain the arm 21 of the bell crank in engagement with the upper wall of the element 24 which wall is formed with a knife edge to reduce friction.

The pivot of the lever 25 extends through the standard 2 and carries an arm 27 provided with a pointer adapted to cooperate with a graduated segment 28. One edge of the segment is notched as at 29 and the arm carries a latch 30ª adapted to engage the notches to lock the arm in position with the pointer indicating the desired graduation on the segment 28.

In the embodiment of the invention illustrated that standard in proximity to the pendulum lever 15 is provided with a segmental slot 32. A pin secured to the lever projects through the slot and carries a knob or handle 31 by means of which the lever may be manually operated to engage the latch 19.

The operation is as follows:

A bag or other container is placed upon the pan 7 directly beneath the spout 11. A weight equal to that of the amount of material to be placed in the bag is placed on the support 9 at the weight end of the beam. The member 18 is adjusted relatively to the lever 15 to give the required opening of the spout. If the spout is to be open to its greatest extent the parts will be positioned as shown in Fig. 2. If a smaller spout opening is desired the member 18 is shifted relatively the lever and the gate will partly close the spout when the lever 15 is in the latched position as shown in Fig. 2 and less movement of the lever toward the vertical position will be required to completely close the spout.

The spring 26 is adjusted by means of the arm 27 to release the latch from engagement with the free end of the lever 15 at a power corresponding to the position at which the gate may be set to determine the volume of the stream of material issuing from the hopper 10. There is now added to the support 9 a weight equal to the pressure of the bell crank arm 21 on the element 24 when sufficient material to raise the weight end of the beam has been deposited in the bag.

The weight end of the beam will now rise, the spring 26 will cause the end of the arm 21 to follow the beam, and the latch 19 will be removed from its engagement with the end of the lever 15. The weight of the lever 15 and of the member 30 will now close the gate and cut off the supply of material to the bag.

As the length of the bell crank lever 20—21 is less than that of the beam between the points 5 and 8 the bell crank will move far enough to permit the spring 26 to withdraw the latch from engagement with the end of the pendulum lever some time before the beam reaches the horizontal or the position of equilibrium.

As there has been added to the weight end of the beam a weight equal to the value of the pull of the spring 26 against the member 24, the beam operates entirely free of the gate closing mechanism, and is not in contact or engagement with the gate operating devices except when the beam is in its inert position, i. e. with the weight end below the horizontal. The contact between the gate mechanism and the beam is preferably broken when the latter has accomplished about one half of its travel between the inert position and the position of equilibrium, and whatever impulse is given to the weight end of the beam by such contact is neutralized by the weight added to the support to balance the value of the spring 26 on the member 24. By this construction and method of operation the size of the stream of material delivered to the scale permit of a range of amounts of weight, and of quick changes from one amount of feed to another.

Because of the adjustability of the weight 30 on its supporting arm a counter adjustment of the value of the spring 26 may be made and perfect control of the amount of material in transit between the hopper 10 and the scale may be maintained even with considerable deviation in the size of the stream.

The scale beam 3 performs no function other than determining the weight. By placing the gate operating weight 30 and the long arm 15 on the same shaft a single lever is produced and said lever is fulcrumed at the point of suspension. When such lever is in latched position it must be figured geometrically by the laws governing pendulums. It will thus be seen that the value of one pound at the gate decreases many times at the free end of the arm 15 and the friction of the arm at the latch will be practically nil.

The arms 20 of the bell crank, and the latch 19 are so proportioned relatively to the pivot of the bell crank that the latching point is directly in line with the pendulum lever 15 whereby the lip of the latch is pulled directly away from the lever by the movement of the bell crank.

After the weighing is completed the lever 15 will be in a vertical position, or nearly so depending on the initial position of the gate when open. The filled container is removed from the tray 7 and an empty one substituted and the weight end of the scale beam will drop to the inert position thus raising the arm 20, against the tension of the spring 26, to the latching position. The operator will now grasp the knob 31 and move it backward in the slot 32. The free end of the lever 15 will engage the latch 19 below the lip therein but above the pivot thereof and depress the latch until it, the lever, engages behind the lip. The apparatus will now be in position to close the gate when sufficient material to bring the scale beam to equilibrium has been deposited in the container.

The weight 30 may be adjusted along its supporting arm to vary the leverage of the arm, the arm may be adjusted on the shaft 14, or both adjustments may be employed.

The device illustrated and described herein is designed for retailers for packaging such commodities as sugar, coffee, rice, etc. at odd times, and to be manually operated, but it is desired to have it understood that power may be employed to open the gate if desired, particularly when the apparatus is intended for continuous use.

In accordance with the provisions of the patent statutes the principle of the invention has been described, together with what is now considered to be the best embodiment thereof, but it is to be understood that the apparatus shown is merely illustrative and that the invention may be carried out in other ways.

Having now described the invention what is claimed and desired to be secured by Letters Patent, is:—

1. A scale comprising a beam, means carried by the beam and adapted to receive material to be weighed, a weight carried by the beam, a valve for interrupting the supply of material, means actuated by the beam for securing the valve in open position, and means independent of the beam for closing the valve.

2. A scale comprising a beam, means carried by the beam and adapted to receive material to be weighed, a device for feeding the material to the receiving means, a valve for the device, means actuated by the beam for locking the valve in open position, means independent of the beam and gravity operated means for closing the valve.

3. A scale comprising a beam, means carried by the beam and adapted to receive material to be weighed, a device for feeding the material to the receiving means, a valve for the device, means actuated by the beam for locking the valve in open position, means independent of the beam for unlocking the valve and adjustable gravity operated means for closing the valve.

4. A scale comprising a beam, means carried by the beam and adapted to receive material to be weighed, a device for feeding the material to the receiving means, an adjustable valve for the device, means engaging the beam for locking the valve in open position, means released by the movement of the beam for unlocking the valve, and gravity operated means for closing the valve.

5. A scale comprising a beam, means carried by the beam and adapted to receive material to be weighed, a device for feeding the material to the receiving means, a valve for the device, means actuated by the beam for positioning the valve in open position, and a pendulum for closing the valve.

6. A scale comprising a beam, means carried by the beam and adapted to receive material to be weighed, a device for feeding the material to the receiving means, a valve for the device, means for positioning the valve in open position, said means including a spring actuated lever and an adjustable pendulum for closing the valve.

7. A scale comprising a beam, means carried by the beam and adapted to receive material to be weighed, a chute for feeding material to the receiver, a valve for the chute, a weight carried by the beam to counterbalance the material on the receiver, a latch for locking the valve in open position, said latch being brought to locking position by engagement of the beam, and means independent of the beam for releasing the latch.

8. A scale comprising a beam, means carried by the beam and adapted to receive material to be weighed, a chute for feeding material to the receiver, a valve for the chute, a weight carried by the beam to counterbalance the material on the receiver, a latch for locking the valve in open position, said latch being brought to locking position by engagement of the beam, means independent of the beam for releasing the latch, and means for closing the valve.

9. A scale comprising a beam, means carried by the beam and adapted to receive material to be weighed, a chute for feeding material to the receiver, a valve for the chute, a weight carried by the beam to counterbalance the material on the receiver, a latch for locking the valve in open position, said latch being brought to locking position by engagement of the beam, means independent of the beam for releasing the latch, and gravity operated means for closing the valve.

10. A scale comprising a beam, means carried by the beam and adapted to receive material to be weighed, a chute for feeding material to the receiver, a valve for the chute, a weight carried by the beam to counterbalance the material on the receiver, a latch means adapted to engage the latch for locking the valve in open position, and adjustable means independent of the beam for releasing the latch engaging means.

11. A scale comprising a beam, means carried by the beam and adapted to receive the material to be weighed, a chute for feeding material to the receiver, a pivoted valve cooperating with the open end of the chute, an arm carried by the valve, a latch adapted to engage the free end of the arm to secure the valve in open position, a weight carried by the beam and adapted to be counterbalanced when a predetermined amount of material has been deposited on the receiver, said latching means engaging the beam, and mechanical means independent of the beam for releasing the engagement of the arm and latch whereby the valve will be closed.

12. A scale comprising a beam, means carried by the beam and adapted to receive the material to be weighed, a chute for feeding material to the receiver, a pivoted valve cooperating with the open end of the chute, an arm carried by the valve, a latch adapted to engage the free end of the arm to secure the valve in open position, a weight carried by the beam and adapted to be counterbalanced when a predetermined amount of material has been deposited on the receiver, means carried by the beam for engaging the arm and latch, and mechanical means independent of the beam for releasing the engagement of the arm and latch whereby the valve will be closed.

13. A scale comprising a beam, means carried by the beam and adapted to receive the material to be weighed, a chute for feeding material to the receiver, a pivoted valve cooperating with the open end of the chute, an arm carried by the valve, means for adjusting the arm relatively to the valve, a latch adapted to engage the free end of the arm to secure the valve in open position, a weight carried by the beam and adapted to be counterbalanced when a predetermined amount of material has been deposited on the receiver, said latching means engaging the beam, and means independent of the beam for releasing the engagement of the arm and latch whereby the valve will be closed.

14. A scale comprising a beam, means carried by the beam and adapted to receive the material to be weighed, a chute for feeding material to the receiver, a pivoted valve cooperating with the open end of the chute, an arm carried by the valve, a latch adapted to engage the free end of the arm to secure the valve in open position, a weight carried by the beam and adapted to be counterbalanced when a predetermined amount of material has been deposited on the receiver, said latching means engaging the beam, and adjustable means independent of the beam for releasing the engagement of the arm and latch whereby the valve will be closed.

15. A scale comprising a pivoted beam, means at one side of the pivot for receiving material to be weighed, a weight carried by the beam at the opposite side of the pivot, said weight being adapted to counterbalance the material in the receiver when a predetermined amount has been delivered, a chute for delivering material to the receiver, a valve cooperating with the chute, a latch, means operated by the beam for latching the valve in open position, mechanical means independent of the beam for releasing the latch, and means for closing the valve.

16. A scale comprising a pivoted beam, means at one side of the pivot for receiving material to be weighed, a weight carried by the beam at the opposite side of the pivot, said weight being adapted to counterbalance the material in the receiver when a predetermined amount has been delivered, a chute for delivering material to the receiver, a valve cooperating with the chute, a latch, means operated by the beam for latching the valve in open position, mechanical means independent of the beam for releasing the latch, and a weight for closing the valve.

17. A scale comprising a pivoted beam, means at one side of the pivot for receiving material to be weighed, a weight carried by the beam at the opposite side of the pivot, said weight being adapted to counterbalance the material in the receiver when a predetermined amount has been delivered, a chute for delivering material to the receiver, a valve cooperating with the chute, a latch, means operated by the beam for latching the valve in open position, mechanical means independent of the beam for releasing the latch, and an adjustable weight for closing the valve.

18. A scale comprising a pivoted beam, means at one side of the pivot for receiving material to be weighed, a weight carried by the beam at the opposite side of the pivot, said weight being adapted to counterbalance the material in the receiver when a predetermined amount has been delivered, a chute for delivering material to the receiver, a valve cooperating with the chute, a latch means operated by the beam for latching the valve in open position, mechanical means for releasing the latch before the beam reaches the position of equilibrium, and means for closing the valve.

19. A scale comprising a frame, a beam pivoted in the frame, a tray carried by the beam at one side of the pivot, a weight carried by the beam at the opposite side of the pivot, a chute for delivering material to be weighed to the tray, a pivoted valve cooperating with the chute, an arm adapted to pivot with the valve, a lever pivoted to the frame, said lever engaging beneath the beam at the weight side of the beam pivot when the beam is in the inert position, said arm engaging the lever to lock the valve in open position, a spring for withdrawing the lever from engagement with the arm to release the valve, and means independent of the beam for closing the valve.

20. A scale comprising a frame, a beam pivoted in the frame, a tray carried by the beam at one side of the pivot, a weight carried by the beam at the opposite side of the pivot, a chute for delivering material to be weighed to the tray, a pivoted valve cooperating with the chute, an arm adapted to pivot with the valve, means for adjusting the arm relatively to the valve, a lever pivoted to the frame, said lever engaging beneath the beam at the weight side of the beam pivot when the beam is in the inert position, said arm engaging the lever to lock the valve in open position, a spring for withdrawing the lever from engagement with the arm to release the valve, and means independent of the beam for closing the valve.

21. A scale comprising a frame, a beam pivoted in the frame, a tray carried by the beam at one side of the pivot, a weight carried by the beam at the opposite side of the pivot, a chute for delivering material to be weighed to the tray, a pivoted valve cooperating with the chute, an arm adapted to pivot with the valve, a lever pivoted to the frame, said lever engaging beneath the beam at the weight side of the beam pivot when the beam is in the inert position, said arm engaging the lever to lock the valve in open position, a spring for withdrawing the lever from engagement with the arm to release the valve, means for adjusting the tension of the spring, and means independent of the beam for closing the valve.

22. A scale comprising a frame, a beam pivoted in the frame, a tray carried by the beam at one side of the pivot, a weight carried by the beam at the opposite side of the pivot, a chute for delivering material to be weighed to the tray, a pivoted valve cooperating with the chute, an arm adapted to pivot with the valve, a lever pivoted to the frame, said lever engaging beneath the beam at the weight side of the beam pivot when the beam is in the inert position, said arm engaging the lever to lock the valve in open position, a spring for withdrawing the lever from engagement with the arm to release the valve, means for adjusting the tension of the spring, means independent of the beam for closing the valve, and a stop for limiting the movement of the valve.

23. A scale comprising a frame, a beam pivoted in the frame, a tray carried by the beam at one side of the pivot, a weight carried by the beam at the opposite side of the pivot, a chute for delivering material to be weighed to the tray, a pivoted valve cooperating with the chute, an arm adapted to pivot with the valve, a lever pivoted to the frame, said lever engaging beneath the beam at the weight side of the beam pivot when the beam is in the inert position, a pivoted latch carried by the lever, a spring cooperating with the latch, said arm engaging the latch to lock the valve in open position, a spring for withdrawing the latch from engagement with the arm to release the valve, and means independent of the beam for closing the valve.

24. A scale comprising a frame, a beam pivoted in the frame, a tray carried by the beam at one side of the pivot, a chute for delivering material to be weighed to the tray, a valve cooperating with the chute, a weight carried by the beam at the opposite side of the pivot, said weight being sufficient to balance a predetermined amount of material on the tray, a rock shaft carrying the valve, a pendulum carried by the rock shaft, an arm carried on the rock shaft, a member secured to the rock shaft there being a segmental slot in the member, a fastening carried by the arm and extending through the slot whereby the arm may be adjusted relatively to the valve, a lever pivoted to the frame, one end of said lever engaging the lower side of the weight end of the beam, a pivoted latch carried by the opposite end of the lever, the end of the arm engaging the latch whereby the weight end of the beam will retain the valve in open position when the beam is in inert position, a spring secured to the latch end of the lever, a finger for adjusting the tension of the spring, and means for securing the finger in position.

This specification signed and witnessed this eleventh day of November, 1919.

HUGH CAMERON.

Witnesses:
JAMES F. COLEMAN,
A. E. RENTON.